April 26, 1966 H. H. McDOUGALL 3,247,949
DUAL CONVEYOR MATERIAL HANDLING APPARATUS
Filed Dec. 10, 1964 6 Sheets-Sheet 1
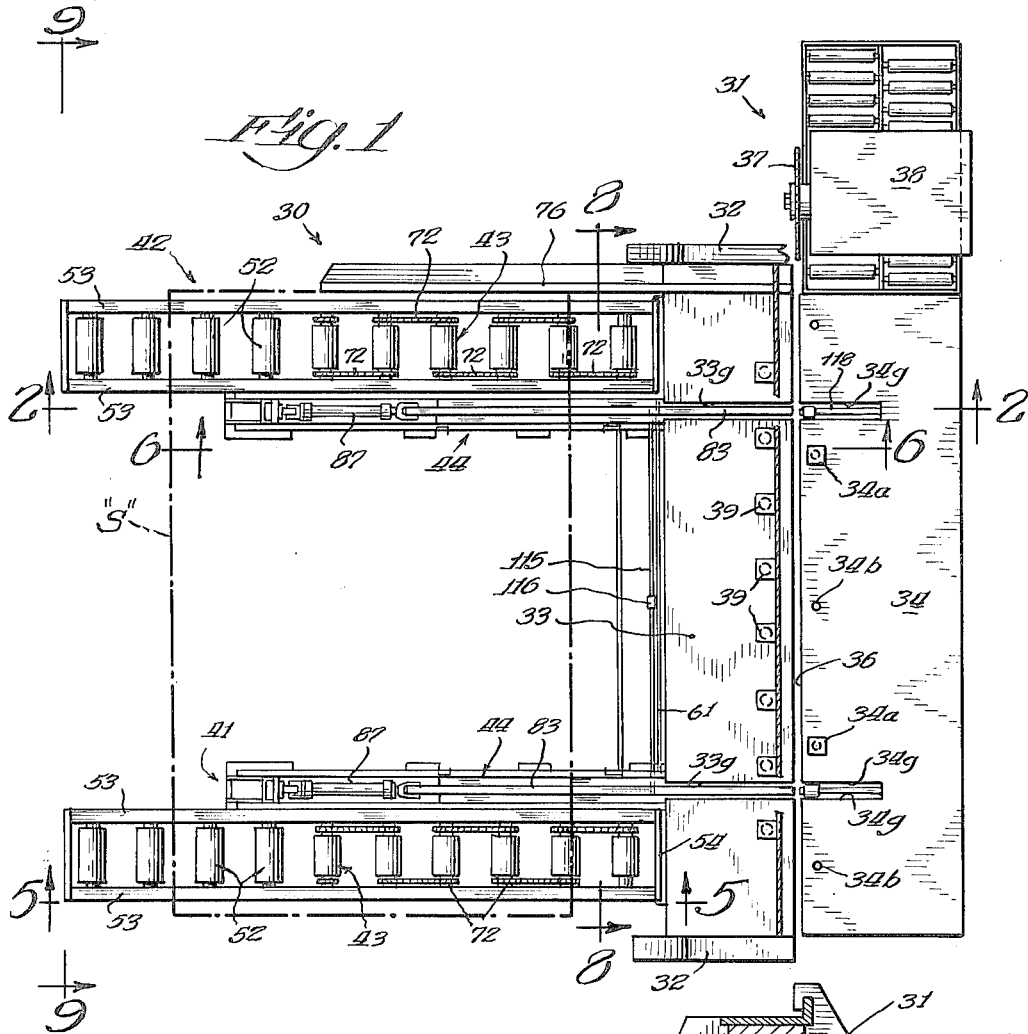
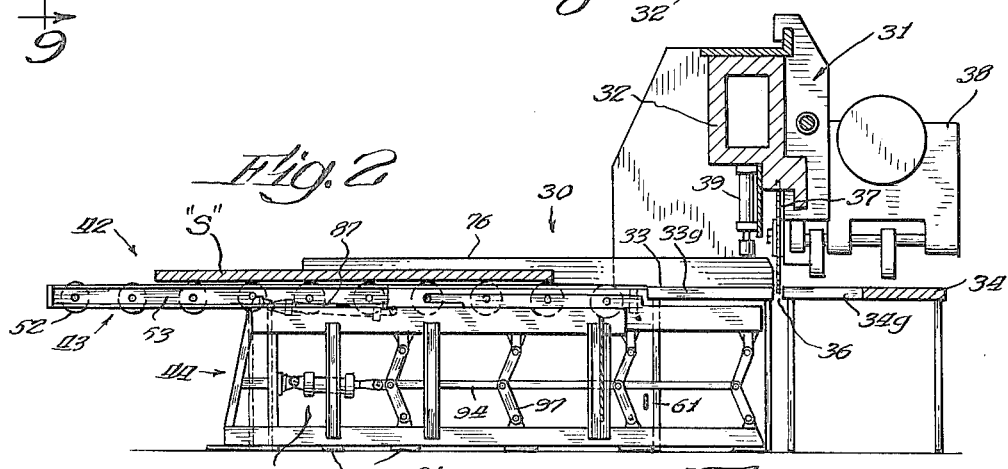
Inventor:
Howard H. McDougall
By HUME, GROEN, CLEMENT & HUME ATTYS

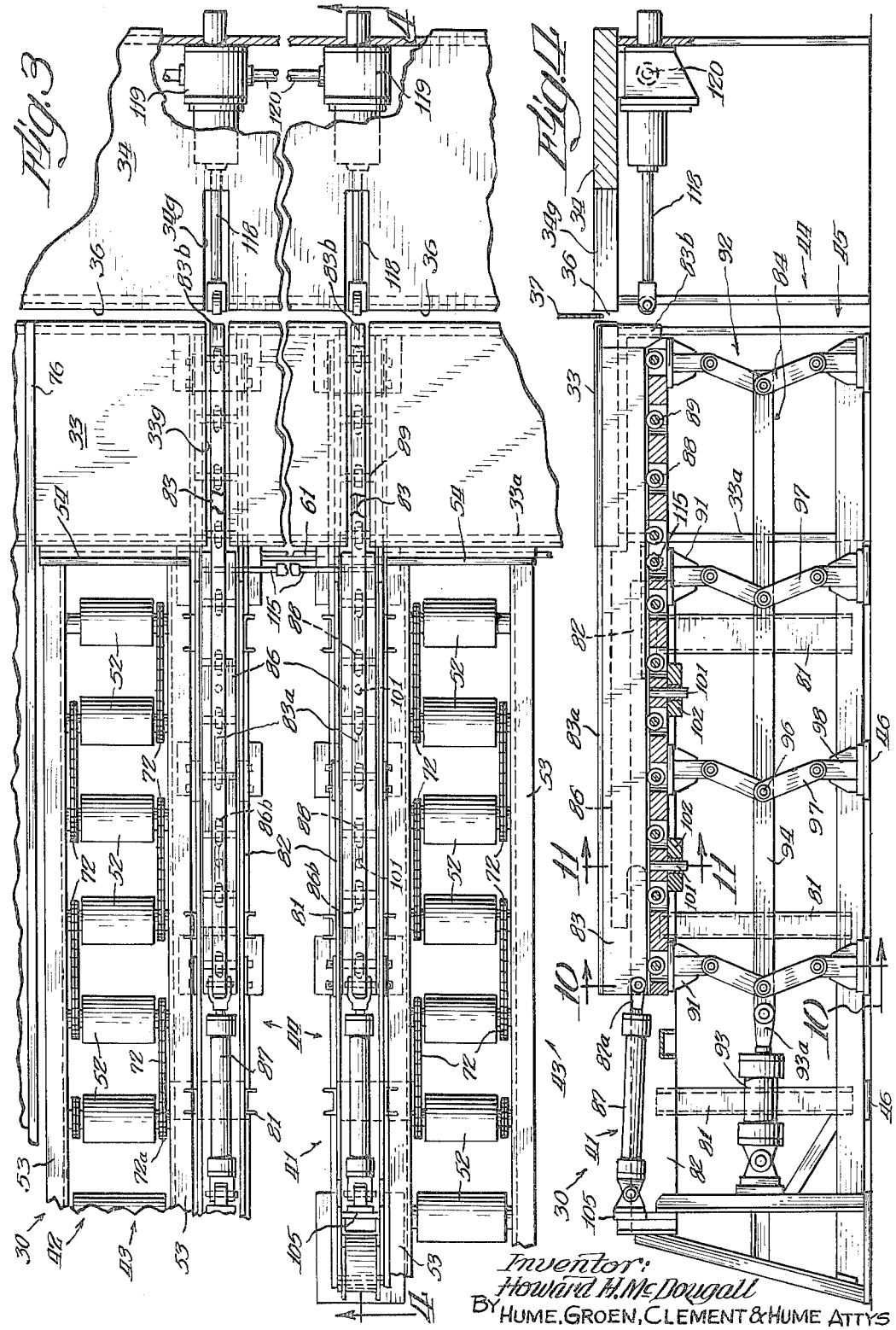

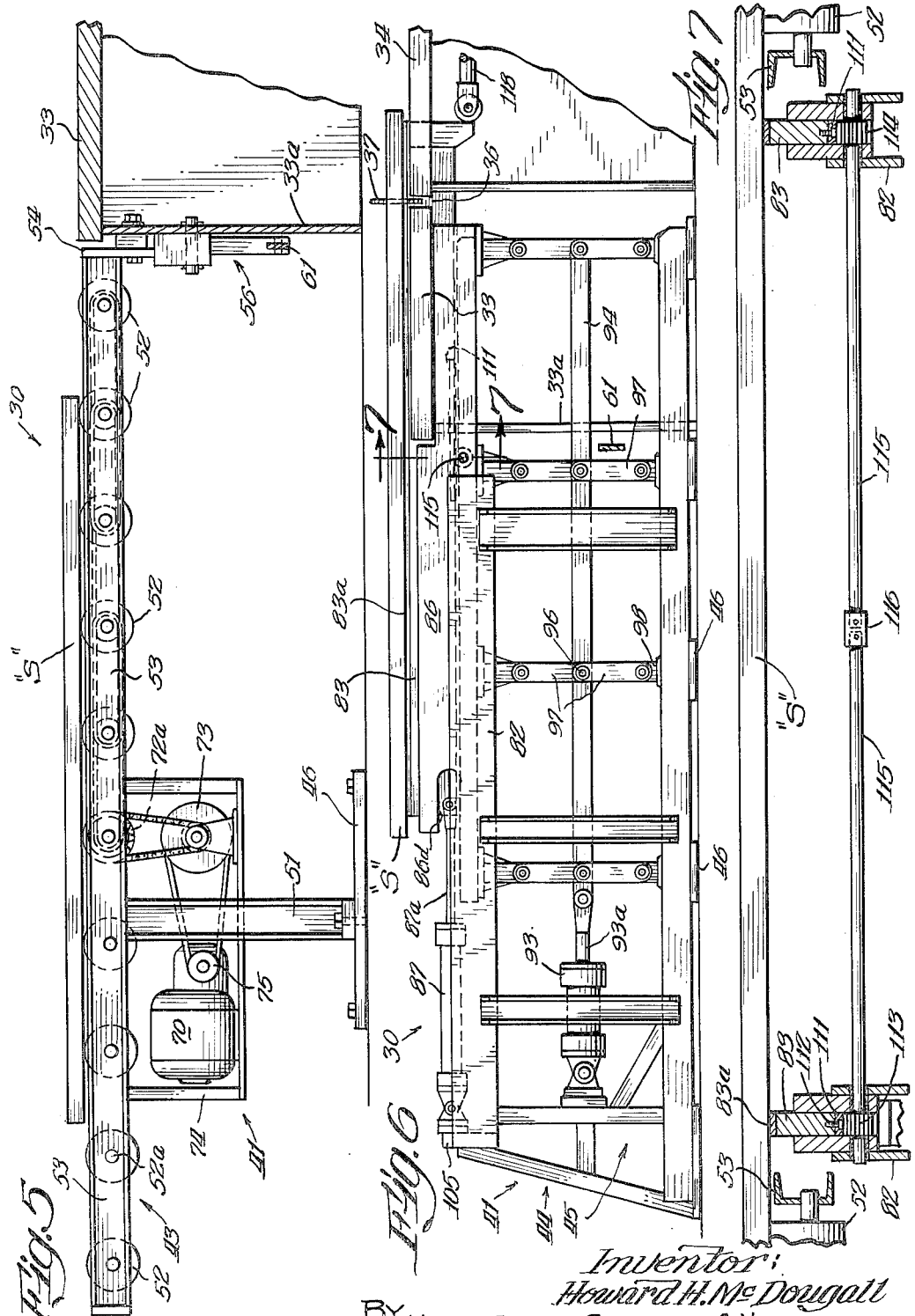

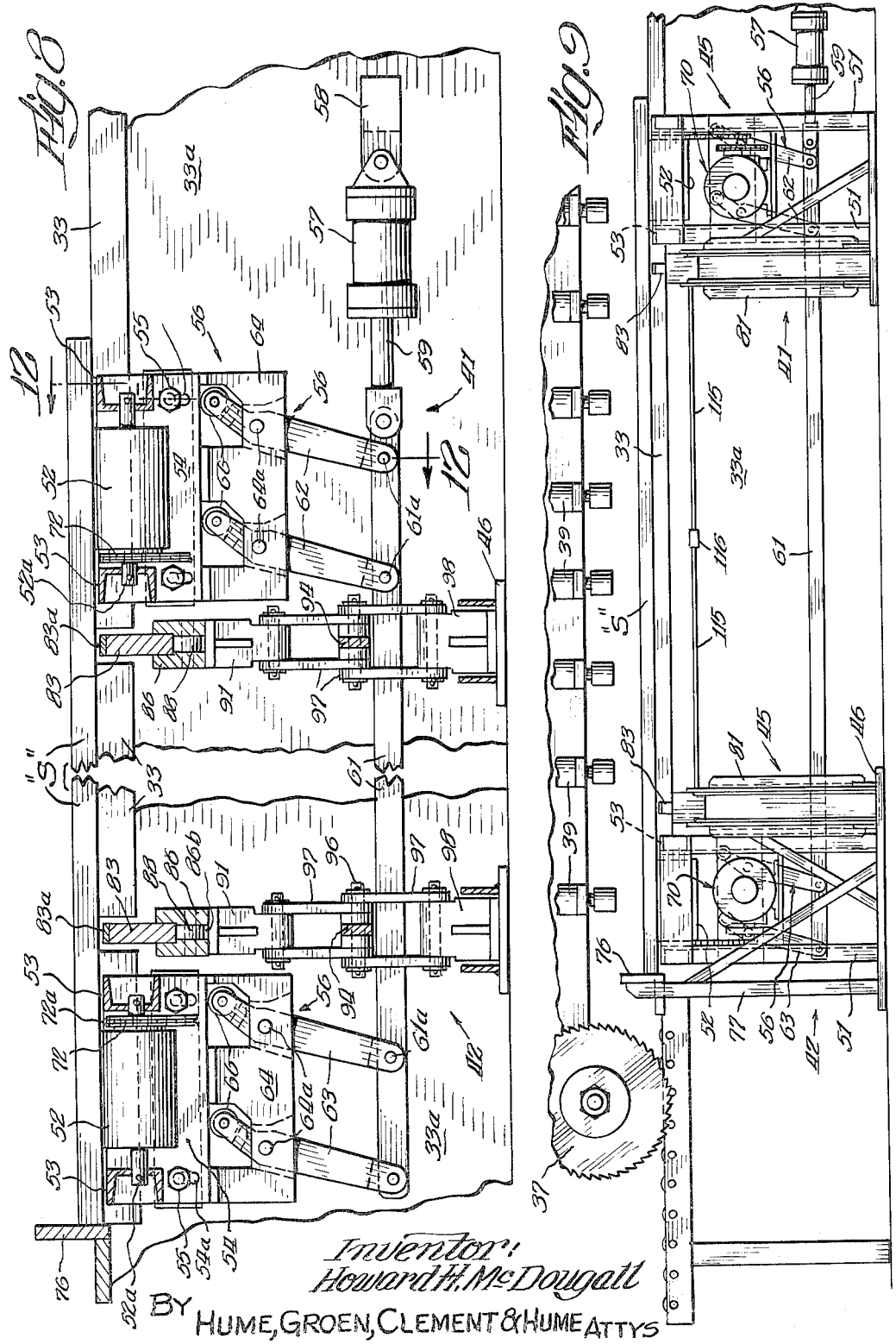

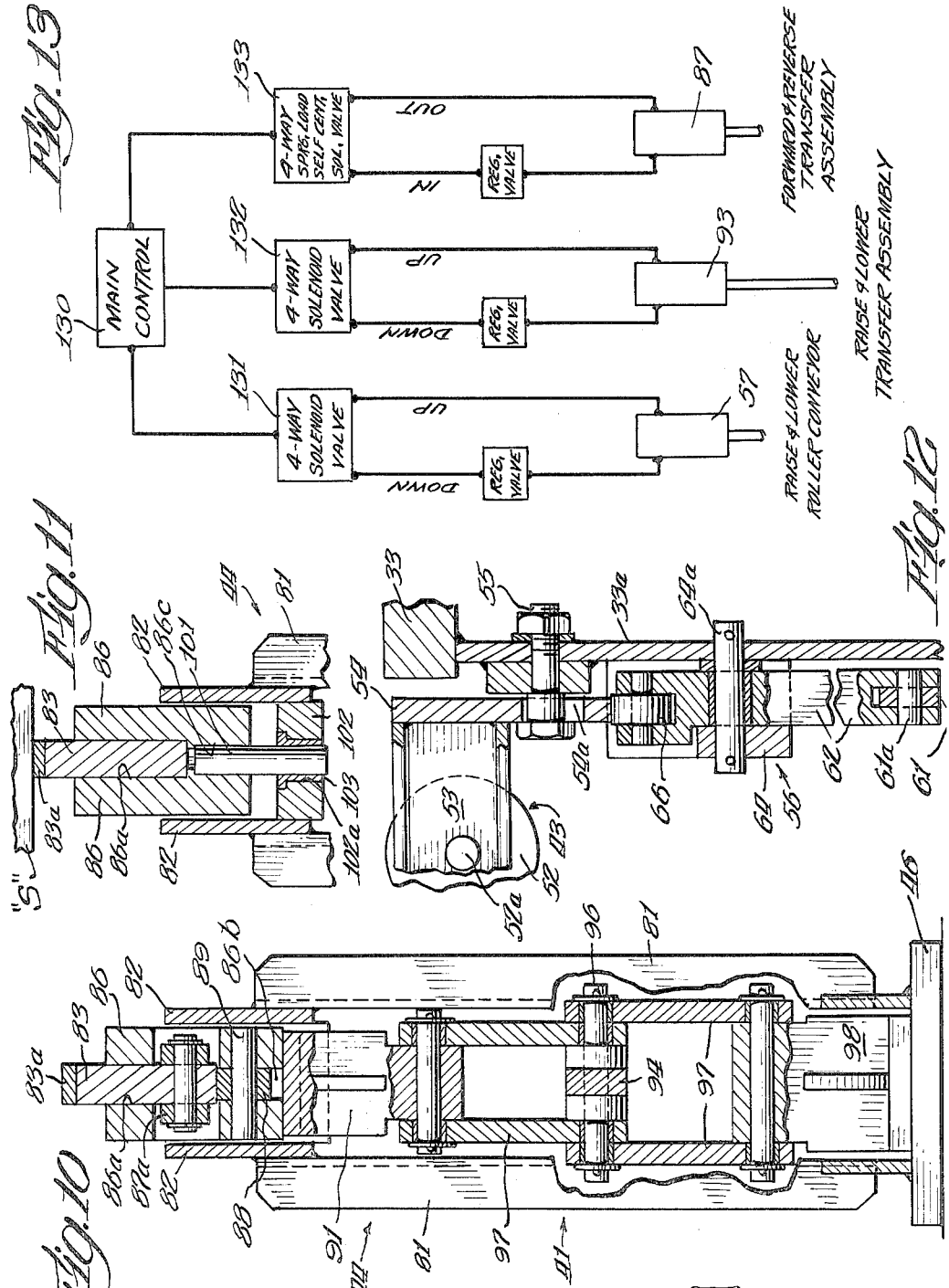

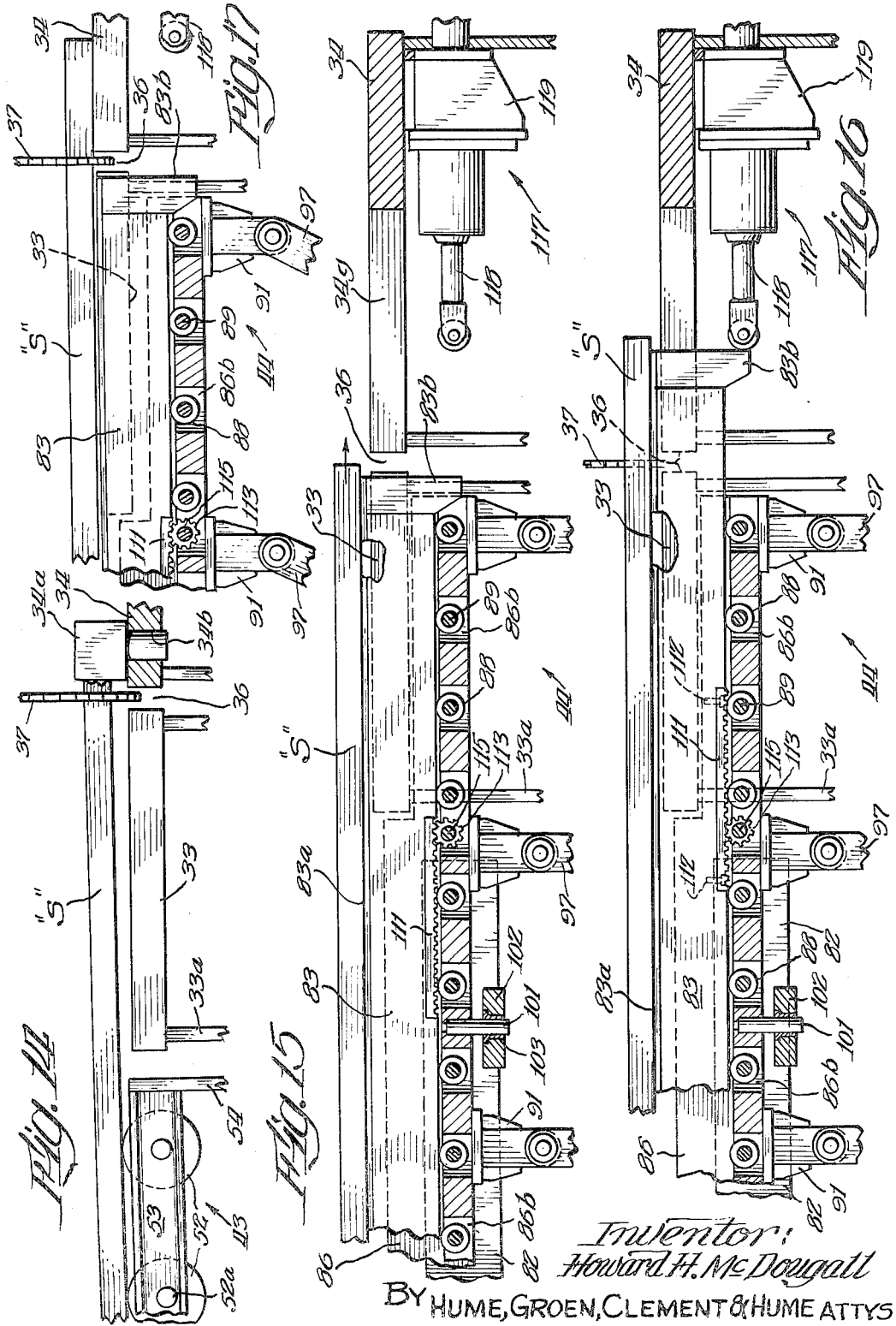

United States Patent Office 3,247,949
Patented Apr. 26, 1966

3,247,949
DUAL CONVEYOR MATERIAL HANDLING
APPARATUS
Howard H. McDougall, Warren, Mich., assignor to Alloy
Steels, Inc., Detroit, Mich., a corporation of Michigan
Filed Dec. 10, 1964, Ser. No. 417,347
4 Claims. (Cl. 198—20)

This invention relates to material handling apparatus and more particularly to an improved apparatus for effecting the automatic feeding of plate stock to machinery that cuts the stock into components of preselected size.

It is an object of the present invention to provide improved material handling apparatus.

Still another object of the invention is to provide material handling apparatus than can be readily employed to effect the automatic transfer or feeding of plate stock to suitable cutting machinery.

A further object of the present invention is to provide apparatus for automatically feeding plate stock to suitable cutting machinery in a rapid and efficient manner.

An additional object of the invention is to provide material handling apparatus that effects the automatic gauged advance of plate stock to suitable cutting machinery so that preselected pieces of the stock can be severed therefrom in a sequential fashion.

A further object of the present invention is to provide material handling apparatus that can rapidly and efficiently transfer large size pieces of plate stock weighing several tons, which apparatus is further characterized by a relatively simple and low cost construction.

Other objects and advantages of the present invention will become apparent from the following detailed description of one preferred embodiment thereof, particularly when considered in conjunction with the accompanying drawings wherein:

FIGURE 1 is a plan view of a preferred embodiment of the material handling apparatus when utilized with machinery that effects the cutting of plate stock supplied thereto by the apparatus;

FIGURE 2 is a cross-sectional view taken along the line 2—2 in FIGURE 1 and depicting a piece of plate stock that is supported thereon and ready to be transferred to the cutting machinery;

FIGURE 3 is an enlarged fragmentary plan view further depicting the principal components of the material handling apparatus as shown in FIGURE 1;

FIGURE 4 is a cross-sectional view taken along the line 4—4 in FIGURE 3;

FIGURE 5 is an enlarged side elevational view taken along the line 5—5 in FIGURE 1;

FIGURE 6 is an enlarged side elevational view taken along the line 6—6 in FIGURE 1 but depicting the apparatus in an operative position whereby a piece of plate stock has been advanced into the cutting machinery;

FIGURE 7 is an enlarged front elevational view partially in cross-section which depicts a portion of the linking mechanism utilized with the material handling apparatus of the present invention;

FIGURE 8 is an enlarged fragmentary cross-sectional view taken along the line 8—8 in FIGURE 1;

FIGURE 9 is a front elevational view taken along the line 9—9 in FIGURE 1 and further depicting the material handling apparatus and its relation to suitable cutting machinery with which the apparatus is preferably employed;

FIGURE 10 is an enlarged cross-sectional view taken along the line 10—10 in FIGURE 4;

FIGURE 11 is an enlarged fragmentary cross-sectional view taken along the line 11—11 in FIGURE 4 but with the apparatus in the operative position depicted in FIGURE 6;

FIGURE 12 is an enlarged cross-sectional view taken along the line 12—12 in FIGURE 8;

FIGURE 13 is a simplified diagrammatic representation of the control means for various of the components depicted in FIGS. 1–12; and FIGURES 14–17 are views corresponding generally to FIGS. 4 and 6 but depicting the material handling apparatus in its various positions throughout an operating cycle.

As generally outlined above, the present invention is directed to an improved form of material handling apparatus. The apparatus is designed to effect the accurate and reliable transfer of plate stock to suitable cutting machinery that is utilized to sever the stock into bar or smaller plate components. Quite generally, the handling apparatus includes a pair of spaced apart dual advancing devices that are adapted to receive and support the lateral edge portions of pieces of plate stock and to effect the selective gauged feeding thereof to the cutting machinery. In this connection, each of the spaced apart advancing devices preferably includes a "coarse positioning means" comprised of a plurality of driven roller members that normally support the plate stock and a "fine or gauged positioning means" in the form of a transfer bar mechanism.

The driven roller members are utilized to advance the plate stock into alignment with the cutting machinery after the lateral edge portions of the stock have been initially positioned in supported relation on the advancing devices. Subsequent to this initial advance of the plate stock to the cutting machinery and after a trim cut is made along the leading edge portion of the stock, the transfer bar mechanism is utilized to feed the stock to the cutting machinery. In this connection, the apparatus employs selectively adjustable stop means in co-operation with the transfer bar mechanism of each of the dual advancing means so that the stock can be accurately advanced prescribed distances relative to the cutting machinery to yield the production of bar or smaller plate components of various size in response to the cutting machinery being rendered effective. In accordance with the present invention, the transfer bars lift and advance the plate stock to the desired position and thereafter are lowered and withdrawn from contact with the stock.

As will be apparent from the following description, the material handling apparatus of the present invention is highly efficient and is capable of readily handling plate stock weighing several tons. Moreover, the apparatus accommodates pieces of plate stock of various size, including large pieces of stock (e.g. 6 feet by 12 feet by 4 inches). In addition, because a plurality of driven rollers are utilized to rapidly effect the course positioning of the stock and because the transfer bars operate in a rapid and efficient manner, the time required to effect a plurality of cuts from a piece of stock that is advanced to the machinery by the material handling apparatus is notably reduced. In this latter connection, the lifting and advancing and the lowering and withdrawing action of the transfer bars, eliminates misalignment of the stock with the cutting machinery due to frictional drag or the like.

*General construction*

Referring specifically to the drawings, a preferred embodiment of the material handling apparatus 30 is illustrated in conjunction with conventional plate stock cutting machinery 31. Although of a conventional, commercially available design, the cutting machinery 31 is constructed to fully complement the operation of the apparatus 30. In this connection, a rail-type plate sawing machine produced by the Ingersoll Milling Company of Rockford, Illinois and identified as machine #20293 is particularly well suited for use with the apparatus 30.

Quite generally and as shown in FIGS. 1, 2 and 9, this machine 31 includes a support structure 32 and a pair of work tables 33 and 34 that are positioned adjacent each other but in slightly spaced relation so as to define a cutting aperture 36 therebetween. The cutting aperture 36 is proportioned to accommodate a conventional stock cutting blade 37 that is mounted on the support structure 32 for movement relative thereto under the control of a suitable saw drive and indexing means 38. In addition to the drive and indexing means 38, the support structure 32 preferably accommodates a plurality of hold down pistons 39 that are used to engage a piece of plate stock "S" and maintain it in fixed relation relative to the table 33 throughout a cutting operating as hereinafter more fully set forth.

Notwithstanding the particular cutting machinery 31 with which it is utilized, the material handling apparatus 30 preferably includes a pair of selectively operable dual stock advancing units which are perhaps best illustrated in FIGS. 3–8. Referring more specifically to these figures, the material handling apparatus includes a pair of substantially identical dual spaced apart transfer devices 41 and 42. These transfer devices 41 and 42 are mounted in suitable spaced relation so as to receive and support the lateral edge portions of standard sized pieces "S" of plate stock (FIG. 8).

The dual transfer devices 41 and 42 are each comprised of a "coarse positioning means" 43 and a "fine or gauged positioning means" 44, and the positioning means 43 and 44 of the dual transfer device 41 are structurally linked to and adapted to be operated in conjunction with the corresponding components of the device 42. Referring to the detailed features of these positioning means, it will be seen that the mounting for each of one of the units (i.e. the devices 41 and 42 being of essentially identical construction) is provided by a support structure 45. The support structure 45 includes common base plate 46 and a plurality of structural members that are joined to and extend upwardly from the base plate.

*Coarse positioning means*

More specifically and with reference to FIGS. 5 and 9, a plurality of structural members 51 are, in a conventional manner, joined to and extend upwardly from one portion of the base plate 46 in spaced relation to the work table 33. The upper ends of the members 51 are also secured to a pair of elongated brackets 53. These brackets provide a mounting and support housing for a plurality of roller members 52, which comprise the coarse positioning means and which are rotatably mounted between the brackets. Preferably, the forward edge (i.e. the edge closest to the table 33 as shown in FIGS. 5 and 12) of each of the elongated supporting brackets 53 is joined to a mounting plate 54 that is in turn secured to the forward vertical facing plate 33a of the work table 33. The mounting portion of the plate 54, which is joined to the plate 33a by suitable bolts or other suitable fastening means 55, is formed with an aperture 54a that facilitates pivotal upward-downward advance of the mounting plate and, therefore, the entire support structure for the roller members 52, relative to the work table 33 in response to the actuation of a lifting linkage 56.

In this connection, the lifting linkage 56 includes a hydraulic cylinder 57 that is mounted on the forward vertical facing plate 33a of the work table 33 by a mounting bracket 58. A piston member 59 that is associated with the cylinder 57 and actuated in response to hydraulic fluid being selectively supplied to the cylinder, as more fully hereinafter described, is connected to a linking and actuating arm 61. As shown in FIG. 8, the linking and actuating arm 61 is connected to and extends between a pair of camming elements 62 that are provided for the transfer device 41 and a similar pair of camming elements 63 that are provided for the transfer device 42.

Preferably, the camming elements for each of the transfer devices are secured to the linking and actuating arm 61 by suitable pin members 61a and each pair of elements is preferably pivotally mounted within a support housing 64 that is also secured to the facing plate 33a. In a conventional manner, pin members 64a are utilized to effect the pivotal mounting of the camming elements within the support housing 64. As shown most clearly in FIGS. 8 and 12, each of the camming elements 62 and 63 is preferably provided with a roller or bearing member 66 that is offset from the pivot point. These bearing members 66 effect the actual contact with the lower surface of the mounting plates 54 and lift these mounting plates in response to the pivotal upward motion being imparted to the camming elements when the linking arm 61 is advanced from left to right in FIG. 8.

From the foregoing description of the lifting linkage 56, it will be appreciated that the retraction of the arm 61 under the control of the cylinder 57 causes the camming elements 62 and 63 of the devices 41 and 42, respectively, to be simultaneously pivoted within the bracket 64. Moreover, because of the offset mounting of the roller members 66 on the camming elements 62 and 63, an upward advancing force is simultaneously imparted to the lower surface of each of the mounting plates 54. Finally, inasmuch as the mounting plates 54 are secured for movement relative to the forward work table facing plate 33a, this upward advancing force causes the mounting plates and, therefore, the supporting brackets 53 and confined roller members 52 to be advanced slightly above the horizontal working surface of this work table. In this connection, the structural members 51 that provide the rearward support for the brackets are spaced from the table 33 so that the desired limited upward advance of the brackets 53 is readily accommodated. That is, the brackets and the roller members that are confined therein are essentially slightly pivoted relative to the rearward mounting structure therefor.

As generally outlined above, the brackets 53 constitute the mounting structure for a plurality of roller members 52. Although not shown in detail, each of the roller members 52 preferably includes an outer hollow cylindrical wear resistant shell that is mounted about a pair of spaced apart bearing members. In a conventional manner, the bearing members are in turn preferably mounted on a shaft 52a that extends between and is fixedly secured to the brackets 53. As a result, the roller members are freely rotatable relative to the shafts 52a and brackets 53 and the forwardmost group of roller members for each of the dual transfer devices are preferably driven by a conventional drive motor associated with each such transfer device.

In this connection, several of the roller members can be freely mounted between the brackets 53 and independent of the synchronized driving motors 70. However, it is also desirable to have a substantial number of the roller members that extend toward the work table 33 to be linked together by a conventional chain drive arrangement 72 (i.e. with chain engaging sprockets 72a being secured directly to the rollers for rotation about the shafts 52a). The chain drive 72 for each transfer device is connected to a speed reducing gear drive 73 that is operated by the drive motor 70 through a conventional belt and pulley means 75. Preferably, the motor 70, the belt and pulley arrangement 75 and the speed reducing gear drive 73 for each transfer device is mounted within a conventional support structure 74 that is mounted on the underside of the brackets 53 so as to be moved with this support structure in response to the actuation of the lifting linkage 56.

In accordance with the present invention, the motors 70 for each of the transfer devices 41 and 42 are synchronized. Accordingly, when a piece "S" of plate stock is properly positioned on the transfer devices, as shown in FIG. 1, and the motors are rendered effective, the stock will be uniformly advanced to a preselected initial position relative to the cutting machinery. In this latter regard, a low friction guide plate member 76 is provided on the transfer device 42 to insure that the lateral side portion of a piece of advancing plate stock is maintained in contact with a reference plane as it is being advanced. As shown in FIGS. 1 and 8, the guide plate member 76 is secured in a conventional manner to the support structure 32 and to a mounting bracket 77.

*Fine or gauged positioning means*

Referring now to FIGS. 4 and 10, it will be seen that the portion of the base plate 46 that supports the gauged positioning means 44 is structurally connected to a plurality of supporting brackets 81. These supporting brackets 81 of each dual transfer device extend upwardly from a portion of the base plate and are joined to a pair of housing plates 82. The brackets 81 and plates 82 define a partial enclosure for a transfer bar 83 which constitutes the fine positioning means, as well as for the linkage and actuating means 84 (FIG. 4) that dictates the controlled up-down and forward-rearward movement of this transfer bar.

More particularly, the transfer bar 83 is supported within a housing member 86, which constitutes one of the major components of the linkage and actuating means 84, so that the upper surface of the transfer bars normally lie below the upper peripheral surface of the roller members 52. The housing member 86 is preferably an elongated block of steel or the like that extends beneath the work table 33 (i.e., see FIG. 6) from adjacent the blade receiving or cutting aperture 36 to a position well forward of the table 33 and in close proximity to an actuating cylinder 87 that dictates the forward and rearward advance of the transfer bar 83.

To accommodate its positioning beneath the table 33, the forwardmost portion of the housing member 86 is cut away, as perhaps best seen in FIGS. 4, 6, 15 and 16. A central longitudinal groove 86a is formed in and extends continuously along the entire length of the upper portion of the housing member 86. The groove 86a is proportioned to readily accommodate the transfer bar 83 so that the guided forward and rearward advance of the transfer bar is realized in response to the actuation of the linkage associated with the cylinder 87 as hereinafter more fully described. To further accommodate this selective movement of the transfer bars of each of the devices 41 and 42, the forward work table 33 is provided with a pair of spaced apart grooves or slots 33g and the forward portion of the rearward work table 34 is provided with a similar pair of grooves or slots 34g. As shown in FIG. 1, the grooves 33g and 34g are aligned with and are proportioned to receive and facilitate the advance of the transfer bars when the plate stock is being advanced to the cutting machinery by these members.

To facilitate the free and unrestricted, yet guided, movement of the transfer bar 83 within the central longitudinal groove 86a of the housing member 86, the housing member is adapted with a plurality of roller elements 88 as illustrated in FIGS. 4 and 10. The roller elements are preferably conventional bearings or the like that are each rotatably mounted on a stationary shaft 89, and the shafts 89 are each secured within the housing member 86. In this connection, one each of the roller elements 88 is preferably mounted within one of a plurality of spaced apart and suitably apertured or slotted portions 86b that are forced in the housing members 86. More specifically, the roller elements 88 are mounted within the uniformly spaced apertures 86b so that at least the upper peripheral edge portion of each such element extends slightly into the groove 86a. As a result, the transfer bar 83 of each of the devices is supported for free and unrestricted forward and rearward movement with the corresponding housing member 86.

At suitably spaced intervals along the underside of the housing member 86 for each device, one each of a plurality of mounting brackets 91 is secured to the housing member (e.g. by welding or the like). These brackets 91 are in turn connected to a scissor-like linkage 92 that is actuated by a hydraulic cylinder 93. That is, the actuated element 93a that is associated with the cylinder 93 is connected in a conventional manner to an actuating and linking arm 94 of the linkage 92. The linkage arm 94 is in turn connected by suitable fasteners 96 to one end of a plurality of connecting links 97. In the illustrated embodiment, the lower connecting end of each of the lower connecting links 97 is secured directly to one of a plurality of mounting brackets 98 that are stationarily mounted (e.g. by bolts or other suitable fasteners) on a portion of base plate 46. In a similar manner, the upper connecting end of each of the upper connecting links 97 is connected directly to the brackets 91.

It will be appreciated that the linkage 92 for each of the devices 41 and 42 is designed to allow the corresponding housing member 86 to be selectively raised and lowered in response to the actuation of the cylinder 93. To faciltate such operation of the linkage, at least a pair of guide pins 101 (see FIG. 11) are secured in spaced relation to the underside of the housing member 86 so as to extend downwardly therefrom. Preferably, the guide pins 101 are force-fit into suitable apertures 86c, which are formed in the underside of the housing member 86, and are secured in place by welding or the like. The guide pins 101 are proportioned to pass through a suitably apertured portion of one of a plurality of stationary guide blocks 102 that are secured between the stationary housing plates 82 of the devices and in alignment with the downwardly projecting guide pins.

In this connection, a suitable bushing member 103, which may be formed of Teflon or other suitable material, is preferably fitted within an apertured portion 102a of each of the guide blocks 102 (see FIGS. 15 and 16). Since the guide blocks 102 are structurally secured to the support structure for each of the transfer devices (i.e. to the housing plates 82) and because the brackets 98 are similarly stationarily positioned on a portion of the base plate 46, the horizontal advance of the linking arm 94 of each device is translated into uniform vertical movement of the housing members 86 and of the transfer bars 83 that are positioned therein.

As generally outlined above, the transfer bar 83 of each of the transfer devices 41 and 42 has the rearward end portion thereof connected (i.e. by suitable fasteners) to the actuated element 87a of the hydraulic actuating cylinder 87. To insure that each of the actuating cylinders 87 which are secured to a portion of the enclosures defined by the supporting brackets 81 and more particularly to rearward mounting brackets 105, accommodate the upward and downward movement of the transfer bar, the rearward mounting end portion of these cylinders are preferably pivotally secured to the brackets. Accordingly, when the transfer bars are advanced upwardly along with the housing members 86, the cylinders 87 pivot upwardly therewith so as to maintain the actuating element 87a of each cylinder in the proper operating relationship with respect to the corresponding transfer bar. Consequently, after the linkages 92 have been actuated to simultaneously raise the housing members 86, uninhibited forward and rearward movement of the transfer bars can be selectively effected under the control of the cylinders 87. In this latter connection, the rearwardmost portion of each of the housing members 86 is preferably provided with a slotted area 86d which accommodates the fastener member that links the actuated element 87a to the rearward portion of the transfer bar 83.

Just as with the driven roller members 52, it is important that the forward and rearward advance of the transfer bar of one of the transfer devices be synchronized with that of the other transfer device. To this end and as perhaps best illustrated in FIGS. 7, 9, 15 and 16, a recessed portion of the underside of each of the transfer bars 83 has a rack element 111 secured thereto by suitable fasteners 112. Each of the racks 111 is of sufficient length to accommodate the maximum forward and rearward advance of the corresponding transfer bar and each is designed to mate with a pinion member 113. The pinion member for each of the transfer devices is secured between the stationary housing plates 82 of that device for rotary motion relative thereto. Referring more specifically to FIG. 7, the rotatably mounted pinion member 113 for the dual transfer device 41 is directly coupled to the corresponding gear or pinion member for the transfer device 42 by a suitable connecting rod 115. In the illustrated embodiment, the connecting rod 115 is comprised of two shorter rod segments that are joined together by a coupling element 116. With this interlinked pinion arrangement, the controlled advance of one of the transfer bars 83 necessarily yields a corresponding advance of the other, notwithstanding a slight difference in time between the full operation of the actuating cylinders 87 for the two transfer devices.

As generally outlined above, the operation of the transfer bars 83 for the devices 41 and 42 is not only synchronized but is also designed to be selectively gauged to insure that components of preselected size can be severed from a piece "S" of plate stock. The gauged operation of the transfer bars 83 to effect this result is realized by the cooperative action between the transfer bars and a pair of synchronized motor operated "stop" units 117. In this connection, one each of the "stop" units 117 is preferably mounted in a conventional manner on the underside of the rearwardmost work table 34 below and in alignment with one set of the aligned grooves or slots 33g and 34g that are formed in the work tables to accommodate the advance of the transfer bars relative thereto. As shown in FIGS. 3, 4, 15 and 16, the "stop" units 117 are each preferably comprised of a stop element 118 and a gear drive mechanism 119 that translates the motion imparted to a driven shaft 120 by a drive motor (not shown) into the selective forward and rearward advance of this stop element. It will be appreciated that the position of the elements 118 dictates the degree of advance of the transfer bars since the forward end portion of each of the transfer bars is provided with a downwardly extending striking plate 83b that is designed to engage the stop element 118 of the corresponding transfer device.

Mode of operation

The novel structural aspects of the invention as previously described will best be understood from a consideration of the overall operation of the material handling apparatus 30. In this connection, when it is desired to effect the automatic feeding of plate stock to the cutting machinery 31 so that components of preselected size can be selectively severed therefrom, a piece "S" of plate stock is placed on the apparatus 30 so that the lateral edge portions thereof are supported by the spaced apart dual transfer devices 41 and 42 (FIG. 1). Since the various actuating cylinder members for the apparatus are in the de-actuated position when a cycle of operation is thus initiated, the lateral edge portions of the plate "S" are supported only by the roller members 53 since, as best illustrated in FIG. 8, the upper peripheral edge portions of these roller members normally extend slightly above the wear strip 83a that is provided on the transfer bars 83. In addition, the plate "S" is positioned so that the lefthand lateral edge portion (i.e. as seen in FIG. 8) abuts and is aligned with the guide plate member 76.

When this initial positioning of the plate "S" is effected and assuming that a trim cut is necessary, as is typical of such stock, the coarse positioning means 43 is rendered effective. As a result, the plate "S" is slightly raised and advanced (i.e., see FIG. 14) into engagement with temporary stop elements 34a that are positioned in accommodating apertures 34b in the forward edge of the rear work table 34. (The temporary stop elements 34a are preferably utilized only for the initial trim cut that is effected by the cutting machinery 31. Subsequent to this operation, the stop elements are removed from the rear work table so as not to interfer with the subsequent gauged transfer of the plate "S" to the cutting machinery under the control of the positioning means 44.)

More particularly, the positioning of the plate "S" is effected by actuating the cylinders 57 so that the lifting linkage 56 pivots the forwardmost driven roller members 52 and the associated mounting structure therefor slightly above the level of the forward work table 33. With reference to FIG. 13, this operation of the cylinder 57 is preferably controlled from a main control panel 130 which, although diagrammatically illustrated in FIG. 13, is not shown in the other drawings. The main control panel 130 is preferably manned by an operator who is responsible for the operation of both the material handling apparatus 30 and the cutting machinery 31.

More specifically, in response to a signal from the main control panel 130, a suitable solenoid valve 131 is actuated to allow hydraulic fluid to be supplied to the cylinder 57. This causes the linkage 56 to be actuated and thereby effect the pivoting of the roller member structure as previously described. When this operation is completed, the synchronized roller member drive motors 70 are simultaneously rendered effective by the operator at the control panel and the stock is advanced into the cutting machinery 31 until the forward edge thereof engages the temporary stops 34a. Thereafter, the motors 70 are cut off and the solenoid valve 131 is again actuated so as to cause the lifting linkage under the control of the cylinder 57 to lower the roller members to their normal position. Finally and just prior to the trim cut, the operator actuates the necessary controls for the cutting machinery 31 and brings the hold down pistons 39 into engagement with the plate stock.

Upon completion of an initial trim cut and after the desired size of the components to be severed from the plate "S" has been determined, the gauged positioning means 44 of the dual transfer devices are conditioned for operation. In this connection, the stop elements 118 are positioned in the appropriate location necessary to insure the severing of the desired sized components from the plate. Preferably, the positioning of the stop elements is effected by the operator at the control panel 130. That is, the operator actuates the drive motor (not shown) that dictates the controlled simultaneous advance of the stop elements 118 to the desired final position in anticipation of a gauged cutting operation. A meter or other suitable indicating device is preferably associated with the control for the stop element drive motor so that the operator has an immediate indication at hand as to the specific final location of the devices. Preferably, this meter or indicating device is calibrated in terms of the dimensions of the components to be severed from the plate "S" (i.e. the meter will indicate two inches when the stop elements are located so as to facilitate the severing of a two-inch component from the plate stock).

After the stop elements 118 are simultaneously positioned, the actuating cylinders 93 are simultaneously rendered effective to raise the housing members 86 and accordingly the transfer bars 83. As is apparent from FIG. 13, an appropriate signal from the main control panel 130 causes a four-way solenoid valve 132 to be rendered effective and this solenoid dictates the operation to the cylinders 93 so that the linkage 92 is actuated to raise both the transfer bars and the plate stock that is supported thereon (FIG. 15).

After the plate "S" has been raised, the actuating cylinders 87 are concomitantly rendered effective in a generally similar manner under the control of a four-way solenoid valve 133 and in response to an appropriate signal from the main control panel 130. With reference to FIG. 16, the simultaneous actuation of the cylinders 87 advances the transfer bars 83 and particularly the striking plate 83b of each into engagement with the stop elements 118. Preferably, the actuating cylinders 87 are provided with conventional pressure responsive means so that the advancing force imparted to the transfer bars is cutoff when the stop elements are engaged thereby.

Upon completion of this final positioning of the plate stock, the cylinders 93 under the control of the valve 132 are rendered effective to lower the transfer bars so that the stock plate "S" is now supported by the work tables. Thereafter, the transfer bars are withdrawn under the control of the cylinders 87, the hold down pistons 39 are actuated and the saw blade 37 is indexed relative to the plate "S" to effect the cutting thereof as shown in FIG. 17.

From the foregoing, it will be appreciated that successive components of the same or of varying size can be readily severed from a piece of plate stock with a high degree of accuracy. Moreover, it will be seen that the cooperative functioning of the coarse and gauged positioning means of the dual transfer devices insures rapid and efficient cutting operations. It will be appreciated by those skilled in the art that the various actuating components of the apparatus will be suitably inter-related and/or interlocked to preclude one portion of the apparatus from being inadvertently rendered effective before another portion thereof has completed its operating function. Although the schematic representation of the control means depicted in FIG. 13 does not include such an interlocked arrangement, conventional means will be employed in conjunction with each of the actuating cylinders and/or the control valves therefor to insure the proper operation of the material handling apparatus.

It should be understood that the foregoing description is merely illustrative of one preferred embodiment of the invention and that the aforedescribed desirable results can be achieved even though various obvious modifications might be effected in the described structure (e.g. to render the operation of the apparatus fully automatic, to accommodate plate stock components of unusual size or configuration, etc.). Any such changes or modifications of the structural features of the apparatus as outlined above that might be effected by one skilled in the art would clearly not constitute a departure from the invention as defined in the accompanying claims.

What is claimed is:

1. Material handling apparatus for supplying plate stock to suitable cutting machinery, which apparatus comprises a pair of dual transfer devices, each of said dual transfer devices including a coarse positioning means and a gauged positioning means joined in side by side relationship, a structure mounting said dual transfer devices in spaced apart side by side relationship so that the lateral edge portions of a piece of plate stock are supportable and engageable by both positioning means of each of said dual transfer devices, means for effecting the simultaneous actuation of said coarse positioning means for each of said dual transfer devices so as to effect the controlled advancement of plate stock thereby independent of said gauged positioning means, means for simultaneously rendering effective the gauged positioning means for each of said dual transfer devices so as to effect the controlled advancement of plate stock thereby independent of said coarse positioning means, and selectively adjustable stop means that co-act with said gauged positioning means to selectively limit the travel of said gauged positioning means.

2. Material handling apparatus for supplying plate stock to suitable cutting machinery preferably of the type having a stock cutting blade that can be indexed through a cutting aperture defined by a pair of work tables that are adapted to receive plate stock that is transferred thereto by said apparatus and support the plate stock during subsequent cutting operations, which apparatus comprises a pair of dual transfer devices, each of said dual transfer devices including a coarse positioning means and a gauged positioning means joined in side by side relationship, each of said coarse positioning means including a plurality of plate stock supporting and transferring roller members mounted within a support means that is adapted to be selectively raised above the level of the cutting machinery work tables, each of said gauged positioning means including a transfer bar member and a transfer bar receiving housing, said transfer bar receiving housings being proportioned to support said transfer bar members for vertical movement therewith and for forward and rearward movement relative thereto and being adapted to be selectively raised and lowered so that said transfer bar members supported therein can be selectively vertically advanced between a normal position below the plate supporting portion of said roller members and a position above the level of the cutting machinery work tables, a structure mounting said dual transfer devices in spaced apart side by side relationship so that the lateral edge portions of a piece of plate stock are supportable and engageable by both said positioning means of each of said dual transfer devices, means for effecting the simultaneous actuation of said coarse positioning means for each of said dual transfer devices so as to effect the controlled advancement of plate stock thereby independent of said gauged positioning means, means for simultaneously rendering effective the gauged positioning means for each of said dual transfer devices so as to effect the controlled advancement of plate stock thereby independent of said coarse positioning means, and selectively adjustable stop means that co-act with said gauged positioning means to selectively limit the forward travel of said transfer bar members of said gauged positioning means.

3. Material handling apparatus for supplying plate stock to suitable cutting machinery preferably of the type having a stock cutting blade that can be indexed through a cutting aperture defined by a pair of work tables that are adapted to receive plate stock that is transferred thereto by said apparatus and support the plate stock during subsequent cutting operations, which apparatus comprises a pair of dual transfer devices, each of said dual transfer devices including a coarse positioning means and a gauged positioning means joined in side by side relationship, each of said coarse positioning means including a support means and a plurality of plate stock supporting and transferring roller members mounted within said support means, means joined to both of said roller member support means for selectively raising said roller members above the level of the cutting machinery work tables, each of said gauged positioning means including a transfer bar member and a transfer bar receiving housing, said transfer bar receiving housings being proportioned to support said transfer bar members for vertical movement therewith and for forward and rearward movement relative thereto and being adapted to be selectively raised and lowered so that said transfer bar members supported therein can be selectively vertically advanced between a normal position below the plate supporting portion of said roller members and a position above the level of the cutting machinery work tables, means joining said transfer bar members together for simultaneous forward and rearward movement within said transfer bar receiving housings, a structure mounting said dual transfer devices in spaced apart side by side relationship so that the lateral edge portions of a piece of plate stock are supportable and engageable by both said positioning means of each of said dual transfer devices, means for effecting the simultaneous actuation of said coarse positioning means for each of said dual transfer devices so as to effect the controlled advancement of plate stock by said roller members independent of said gauged positioning means, means for simultaneously rendering effective the gauged positioning means for each of said dual transfer devices so as to effect the controlled advancement of plate stock by said transfer bar members independent of said coarse positioning means, and selectively adjustable stop means that co-act with said gauged positioning means to selectively limit the forward travel of said transfer bar members of said gauged positioning means.

4. Material handling apparatus for supplying plate stock to suitable cutting machinery preferably of the type having a stock cutting blade that can be indexed through a cutting aperture defined by a pair of work tables that are adapted to receive plate stock that is transferred thereto by said apparatus and support the plate stock during subsequent cutting operations, which apparatus comprises a pair of dual transfer devices, each of said dual transfer devices including a coarse positioning means and a gauged positioning means joined in side by side relationship, each of said coarse positioning means including a support means and a plurality of plate stock supporting and transferring roller members mounted within said support means, means joined to both of said roller member support means for selectively raising said roller members above the level of the cutting machinery work tables, each of said gauged positioning means including a transfer bar member and a transfer bar receiving housing, said transfer bar receiving housings being proportioned to support said transfer bar members for vertical movement therewith and for forward and rearward movement relative thereto and being adapted to be selectively raised and lowered so that said transfer bar members supported therein can be selectively vertically advanced between a normal position below the plate supporting portion of said roller members and a position above the level of the cutting machinery work tables, means joining said transfer bar members together for simultaneous forward and rearward movement within said transfer bar receiving housings, a structure mounting said dual transfer devices in spaced apart side by side relationship so that the lateral edge portions of a piece of plate stock are supportable and engageable by both said positioning means of each of said dual transfer devices, hydraulic means for effecting the simultaneous actuation of said roller member support means and the raising of said roller members above the level of the cutting machinery work tables, motor operated means for actuating said roller members subsequent to the raising thereof so as to effect the controlled advancement of plate stock by said roller members to said cutting machinery independent of said gauged positioning means, hydraulically actuated means for simultaneously raising said transfer bar receiving housings so that said transfer bars are advanced above the level of the cutting machinery work tables, hydraulically actuated means for effecting the simultaneous actuation of said transfer bar members so as to effect the delivery of plate stock to said cutting machinery by said transfer bar members subsequent to the raising of said transfer bar receiving housings, and motor driven stop means adapted to be mounted on one of the cutting machinery work tables so as to co-act with said transfer bar members and selectively limit the forward travel of said transfer bar members and thereby facilitate the gauged advance of plate stock to said cutting machinery.

References Cited by the Examiner

UNITED STATES PATENTS

| 397,020 | 1/1889 | Noyes | 83—418 |
| 1,860,340 | 5/1932 | Biggert | 83—421 |
| 2,334,645 | 11/1943 | Plumb | 83—421 X |

EVON C. BLUNK, *Primary Examiner.*

R. E. KRISHER, *Assistant Examiner.*